United States Patent
Mobarak et al.

(10) Patent No.: US 9,609,067 B2
(45) Date of Patent: Mar. 28, 2017

(54) PROXY CAPTIVE PORTAL TRAFFIC FOR INPUT-LIMITED DEVICES

(71) Applicant: Amazon Technologies, Inc., Seattle, WA (US)

(72) Inventors: Jason Anthony Mobarak, San Ramon, CA (US); Christopher Karl Lang, Irvine, CA (US); Ozgur Cem Sen, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 137 days.

(21) Appl. No.: 14/557,953

(22) Filed: Dec. 2, 2014

(65) Prior Publication Data

US 2016/0156719 A1 Jun. 2, 2016

(51) Int. Cl.
| | | |
|---|---|---|
| *H04L 9/00* | (2006.01) | |
| *H04L 29/08* | (2006.01) | |
| *H04L 29/06* | (2006.01) | |
| *H04W 12/06* | (2009.01) | |
| *H04W 12/08* | (2009.01) | |

(52) U.S. Cl.
CPC ........ *H04L 67/141* (2013.01); *H04L 63/0884* (2013.01); *H04L 63/10* (2013.01); *H04L 67/02* (2013.01); *H04L 67/28* (2013.01); *H04W 12/06* (2013.01); *H04W 12/08* (2013.01)

(58) Field of Classification Search
CPC combination set(s) only.
See application file for complete search history.

(56) References Cited

U.S. PATENT DOCUMENTS

| | | |
|---|---|---|
| 6,718,015 B1 | 4/2004 | Berstis |
| 2013/0155876 A1 | 6/2013 | Potra et al. |
| 2013/0268666 A1* | 10/2013 | Wilson ............ H04L 63/08 709/225 |
| 2014/0075523 A1 | 3/2014 | Tuomaala et al. |

OTHER PUBLICATIONS

Network Portal Detection. The Chromium Projects. Downloaded Nov. 25, 2014. http://www.chromium.org/chromium-os/chromiumos-design-docs/network-portal-detection.
Wiligear.com. UAM. Downloaded Oct. 15, 2014. Archived at http://docslide.net/documents/uam-wiligearcom.html.
International Search Report, Mailed Feb. 22, 2016, Applicant: Amazon Technologies, Inc., 12 pages.
Varsaysky, "FON Improves WiFi Log On", MartinVarsaysky.net, 2006.

* cited by examiner

*Primary Examiner* — Beemnet Dada
(74) *Attorney, Agent, or Firm* — Seyfarth Shaw LLP; Ilan N. Barzilay; Christopher A. Baxter

(57) ABSTRACT

A system for registering an input-limited device such as a media player with a captive access point that requires completion of a portal web page prior to allowing client devices access to a network such as the Internet. Such captive access points are commonly found in hotels, and may be used for both freely provided public WiFi and for connections that require providing payment. For registration, the input-limited device operates as a proxy, relaying communications with the captive access point back-and-forth to a second device with rich user-input capabilities via an independent communications channel. Registration information is provided to the access point as though it originated with the media player, allowing the media player to acquire access to the network.

20 Claims, 11 Drawing Sheets

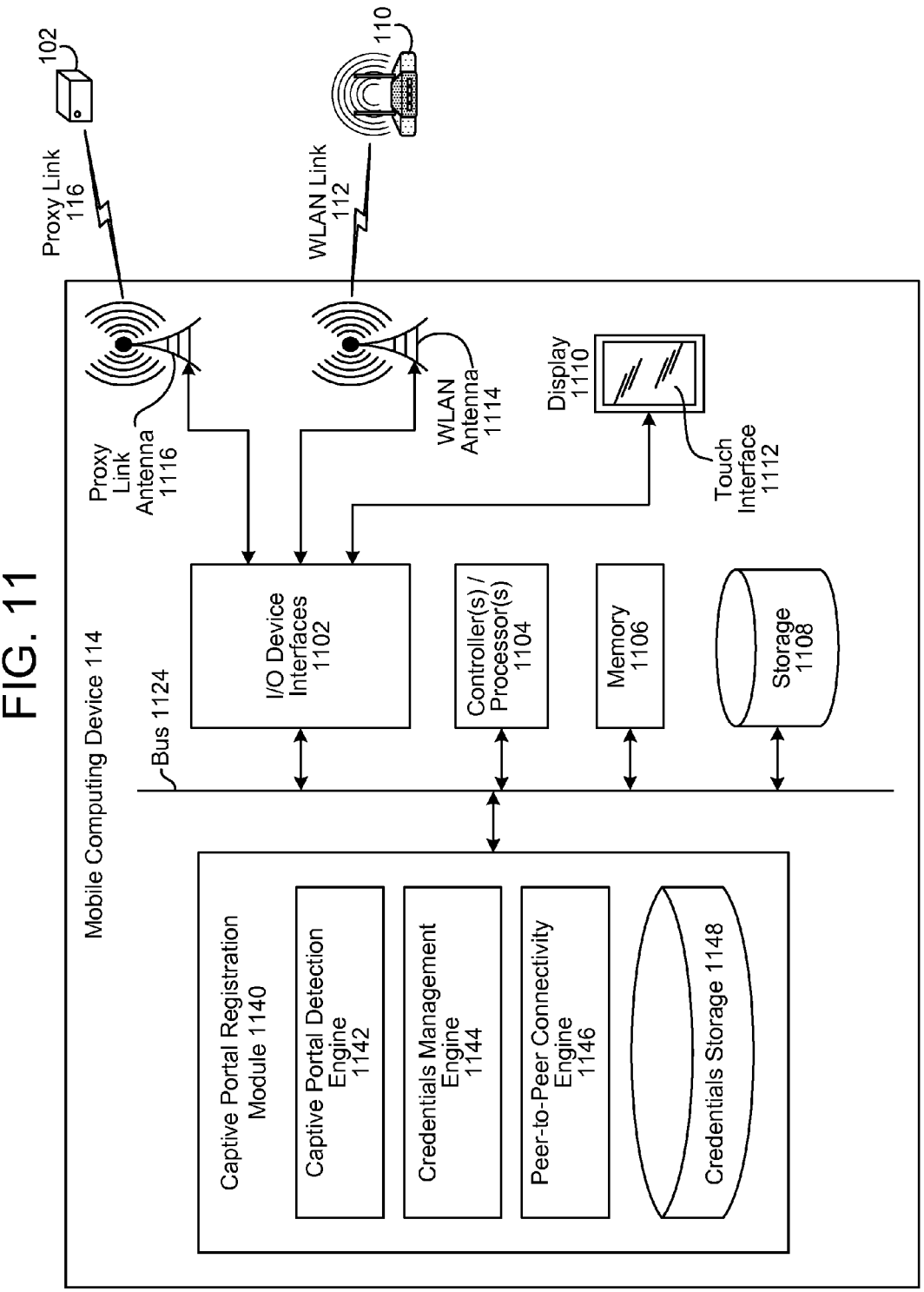

PROXY CAPTIVE PORTAL TRAFFIC FOR INPUT-LIMITED DEVICES

BACKGROUND

Streaming media players are consumer electronics devices that can connect to streaming media services over the Internet and play media on demand to a connected display or television. Streaming media players come in a variety of forms, including as standalone "set-top" boxes, as "dongles" that attach directly to a television (e.g., an HDMI dongle), as a feature built into "smart" televisions, and as a feature built into components such as optical disc players (e.g., DVD, Blu-Ray) and digital video recorders (DVRs).

BRIEF DESCRIPTION OF DRAWINGS

For a more complete understanding of the present disclosure, reference is now made to the following description taken in conjunction with the accompanying drawings.

FIG. 11 is a block diagram conceptually illustrated example components of the mobile computing device.

DETAILED DESCRIPTION

Figure 1:
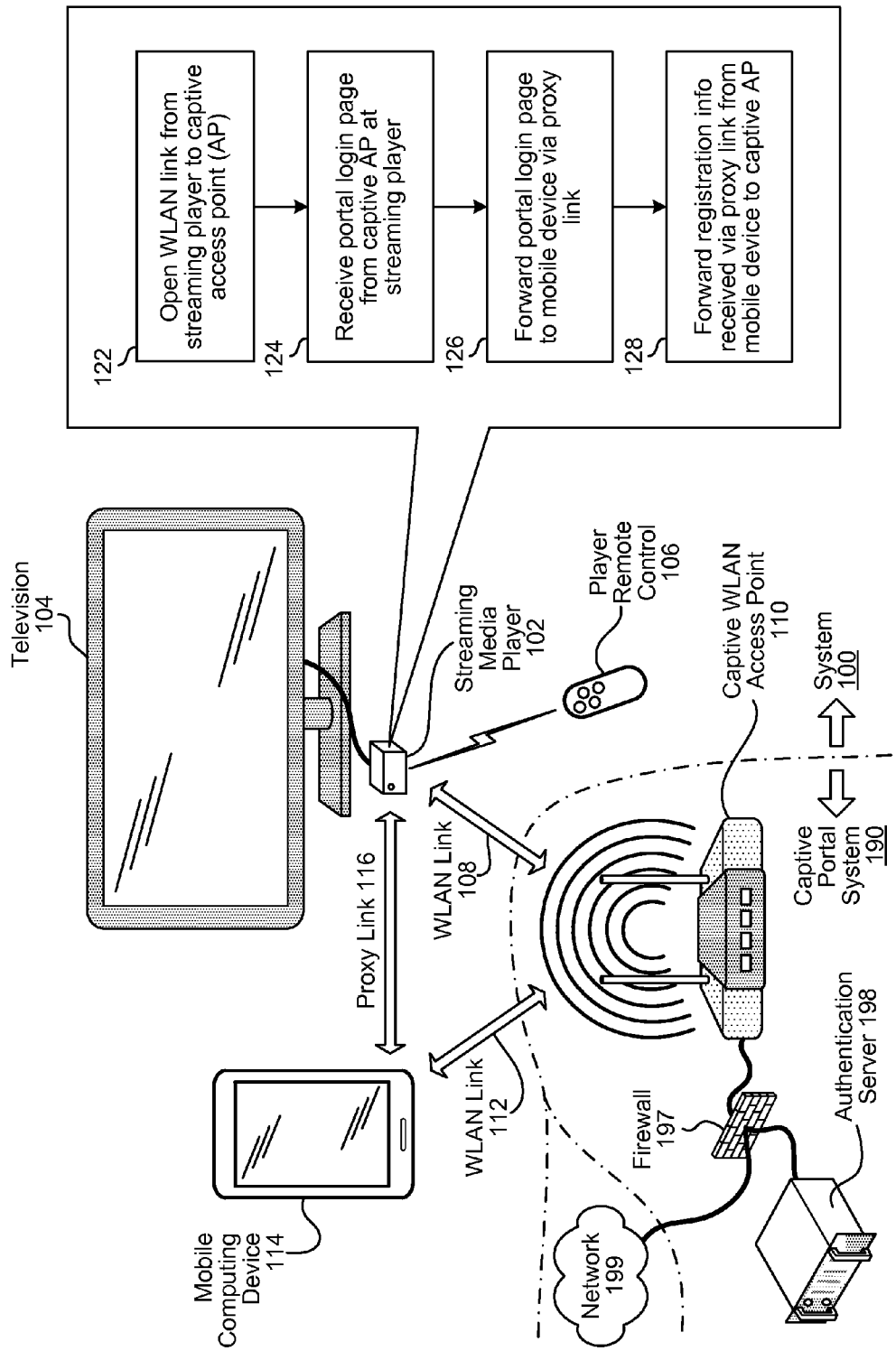
FIG. 1 illustrates a system for sharing login credentials with a streaming media player attempting to access a captive network access point.

Streaming media players typically have limited user interface capabilities for entry of text information. For example, a streaming media player may display a keyboard on a connected television so that a user may select alphanumeric characters one-at-a-time using directional buttons on a remote control of the media player, but lacks an alphanumeric keyboard supporting single-keystroke direct user input of text characters for text entry. This time-consuming method of entering text requires multiple button presses to enter each text character and is more difficult to navigate than a direct entry interface. Text entry is sometimes needed, such as when a user of a media player must enter login credentials (e.g., user name and password) in order to join a secure wireless access point (e.g., a wireless local area network (WLAN) access point such as a WiFi access point).

In order to avoid this laborious entry method, various credential sharing schemes have been devised. One scheme is to have a wireless computing device (such as a notebook computer, tablet computer, or smart phone) that has full-featured user interface capabilities connect to the secure access point, and then share the login credentials with other devices by peer-to-peer (P2P) connections such as WiFi Direct, Bluetooth, or Near Field Communication (NFC) connections. The other devices can then use the shared credentials to access the wireless access point.

Another scheme is to have the wireless computing device login to the secure access point and then upload the credentials to-be-shared to a server in the "cloud." Other devices then connect to the server to acquire the credentials using a secondary network, such as a cellular telephony data network.

However, these credential sharing schemes fail when the access point is a captive portal. Unlike secure access points that require credentials to connect, captive access points are typically "open," and allow a client device to connect without credentials. However, after connecting, the captive access point forces a connecting client device to display a special web page that a user must complete to acquire network access privileges.

The web page may be used for authentication purposes, and may require a new user to accept terms-of-service, provide login credentials, and/or provide a method of payment to gain network access. Until the user completes portal registration through the web page, access to the network beyond the captive access point is limited or blocked. Captive portals are commonly deployed at hotels and used by public WiFi "hotspots."

Captive portal standards have not been widely accepted. Captive portal implementations tend to be ad hoc, providing inconsistent protocol-level support and limiting the ability of software and hardware developers to automate the registration process. Besides not being compatible with the credential sharing schemes used with secure access points, captive portals can be an insurmountable hurdle for streaming media players or other devices that lack web browsers. Without a web browser, the portal web page provided by the captive access point cannot be displayed nor completed by a user, even if credentials are acquired from another device. Unless the streaming media device is able to tether to a network through another device (e.g., connecting to the Internet by relaying data through a smart phone, which itself may have access to the Internet through the captive access point), a streaming media device that lacks a web browser will be unable to access remote media.

Overcoming the obstacles posed by captive portals, FIG. 1 illustrates a system 100 where a streaming media player 102 serves as a proxy so that a mobile computing device 114 can interact with a captive access point 110 through the streaming media player 102. The mobile computing device 114 is used to respond to the portal and register the streaming media player 102 with the captive access point, providing the player 102 access to an outside network 199 such as the Internet.

In computer networking, a "proxy" functions as a bridge between two device, passing on data and requests from one device to the other. When a proxy forwards data packets from one device to the other, it substitutes its own media access control (MAC) address (a unique device identifier discussed further below), and replaces any information about the origin of the packets in the packet headers to identify itself as being the packet's point-of-origin (in effect, shielding one device from seeing the other). A "captive"

access point is a wired or wireless network access point that requires login via a web browser prior to granting network access privileges. A "portal" is a web page that is used to authenticate user credentials, get a user to accept terms, and/or to get user payment information, prior to granting a client device access to the network 199 (e.g., the Internet).

A streaming media player is an example of an "input-limited" device. An input-limited device is a device which does not have rich user input capabilities (e.g., a device lacking a physical alphanumeric keyboard, and/or lacking a touch interface allowing direct interaction with a virtual alphanumeric keyboard, such that there is no provision for direct single-keystroke entry of alphanumeric text characters). In an effort to simplify explanation, streaming media players are described herein as an example of an input-limited device due to their ubiquity. However, the principles and examples described herein apply to any input-limited device. Also, although the examples describe the access point as being to a wireless network, the principles of operation also apply to wired networks, such as an Ethernet gateway, where a client device is presented with a portal web page that must be completed in order to access a network through the captive gateway.

Captive portals systems (e.g., 190) may record the media access control (MAC) address of connecting devices. Devices registered through the portal are recognized by their MAC address, and are allowed to access the network 199 (e.g., the Internet) beyond the firewall 197. A MAC address is a unique identifier assigned to network interfaces of a device for communications. MAC addresses are used as a network address/name for most IEEE 802 network technologies, including WiFi and Ethernet. MAC addresses are usually fixedly assigned by the manufacturer of a network interface controller (NIC) and are stored in its hardware. By having the streaming media player 102 serve as a proxy, interactions with the captive access point 110 during registration appear to originate from the MAC address of the streaming media player 102.

Devices with MAC addresses that are not associated with registered devices are directed by a firewall 197 to the portal, which may be provided by an authentication server 198. A typical captive portal setup is to have a firewall 197 intercept network packets from an unregistered client device until the device registers with the authentication server 198. Depending upon the network protocols supported, the authentication server 198 may cause an unregistered device to launch a web browser by pushing a portal web page to the unregistered device, or the captured portal system may wait until the unregistered device attempts to access an address via the network 199 (e.g., attempts to access a uniform resource locator), at which point the firewall 197 redirects the web browser to the portal on the authentication server 198 for registration. Such techniques are sometimes referred to as Universal Access Method (UAM) in implementation and standards forums.

Although a captive portal system 190 comprising a captive access point 110, a firewall 197, and an authentication server 198 are illustrated in FIG. 1, the architecture of the captive portal system 190 is outside of the scope of the present disclosure, and is illustrated purely for explanatory purposes. In some implementations, the firewall 197 and the authentication server 198 are combined. In other implementations, the firewall 197 and the captive access point 110 are combined. In any case, the system 100 is intended to operate with any captive portal architecture where a portal web page must be completed in order to unlock network access.

As illustrated in FIG. 1, the streaming media player 102 opens (122) a WLAN link (108) to the captive access point (110). As will be described further below, the opening of the link may be the result of a user selecting an access point within range from a list displayed on a connected television 104 using the remote control, or may be in response to a directive from a mobile computing device 114 that directs the streaming media player 102 where to connect via the peer-to-peer proxy link 116.

If the media player 102 connects to the access point 110 and switches into operation as a proxy at the direction of the mobile device 114, then there may be no need for the media player 102 to make an initial determination that the access point 110 is captive. However, if the media player 102 connects to the access point 110 on its own (e.g., having the user select an access point displayed on the television 104 using the remote control 106), the streaming media player 102 may determine that the access point 110 is captive.

As noted above, captive portal systems 190 tend to be inconsistent at a protocol level, such that a mobile device cannot passively rely on the captive portal system 190 to identify itself as captive. An active approach that provides consistent identification that a portal is captive is to transmit a request to a specific uniform resource locator (URL) across the network 199 after establishing the WLAN link 108/112. The URL requests that a remote server respond with a particular Hypertext Transfer Protocol (HTTP) response status code and a particular message. For example, a request might be sent to a URL requesting media content, where the elicited response is an HTTP status code "202" and a message in a format corresponding to part of the requested content (e.g., the opening of a media stream). (Status code "202" ordinarily indicates that the request was request has been accepted for processing, but the processing has not been completed). As another example, the Android operating system sends a request to a URL known to return an HTTP status code "204" and a message comprising an empty page. (Status code "204" indicates that the request was received and successfully processed, but that the server is not returning any content). A determination is made that the portal is captive if the HTTP status code and/or the message received in response to the URL request is incorrect.

Once the determination is made that the access point is captive, a state machine on the client device (e.g., media player 102, mobile computing device 114) may switch into a "captive" state, periodically resending the URL request in an attempt to elicit the correct response from the remote server, remaining in the "captive" state until the expected response is received. In some captive portal systems, after the authentication server 198 accepts a client device's registration, the captive portal system 190 may send the originally requested URL back to the client device as a redirect, indicating to the client device that the client device should retry network connectivity.

Other approaches may also be used to determine that the access point is captive. However, due to the non-uniformity in how captive portals are implemented, they may not work consistently on an individual basis, and are better implemented in combination. For example, in response to a URL request from the client device, some captive portal systems may return packets with header address information indicating the reply originated from a different network address (than the URL request), without an HTTP status code indicating that the reply came from a different source, which may indicate a captured portal. As other examples, if the captive portal attempts to push unrequested content to the client device (e.g., the portal login page), and/or sends a protocol level request indicating that that the client device should open a web browser, it may indicate a captured portal. Also, to the extent that captive portals support a standard, the captive portal may provide a protocol-level message explicitly indicating that the portal is captive.

At some point after connecting to the captive access point 110, the streaming media player 102 receives (124) the portal login page over the WLAN link 108. If the streaming media player 102 is already connected to the mobile computing device 114 via the proxy link 116, the streaming media player 102 may forward (126) received data on to the mobile computing device 114, including the portal login page. If the streaming media player 102 is not already connected to the mobile computing device 114 via the proxy link 116 when the portal login page is received, the media player 102 may buffer/store the portal login page and forward (126) the page to the mobile computing device 114 after establishing the proxy link 116. In the alternative, after the streaming media player 102 establishes the proxy link 116, the mobile computing device 114 may access or "refresh" the portal page through the access point 110 (e.g., by sending a URL request to elicit a specific response from a remote server on the network 199) via the proxy link 116, at which point the media player 102 forwards (126) the received (124) portal page to the mobile device 114.

The mobile device 114 is then used to complete the portal web page, with the portal web page displayed by the device's web browser. If the mobile computing device 114 has already registered with the captive access point 110 via a WLAN link 112, login fields of the portal web page may be automatically populated with credentials stored by the mobile computing device 114 during its own registration. Buttons and/or checkboxes included on the portal page may also be set based on user actions taken during registration of the mobile computing device 114.

As is known in the art, elements of a web page such as fields, buttons, and checkboxes may be individually identified based on invisible tags embedded in the Hyper Text Markup Language (HTML) that a web browser interprets to compose the displayed page, such that the mobile computing device 114 is able to identify and populated elements of the captive portal web page using stored data associated with the tags.

If the mobile computing device has not already registered through the portal, the portal web page may be completed by a user using the full-featured interface of the mobile computing device 114, using interface components such as a keyboard displayed by the mobile device 114 and interacted with using a touch-sensitive display, or a physical keyboard, to accept direct single-keystroke entry of alphanumeric text. The completed registration is then transmitted over the proxy link 116 to the streaming media player 102. The media player 102 forwards (128) the registration information to the captive access point 110, enabling registration of the media player 102 and with the captive portal. When forwarding (128) to the captive access point 110, the registration information appears to originate from the MAC address of the media player 102 (rather than the mobile computing device 114). In addition, the media player 102 may remove any packet header information identifying the mobile computing device 114 as the origin of the registration information, and may also add packet header information identifying itself as the origin.

Figure 2:
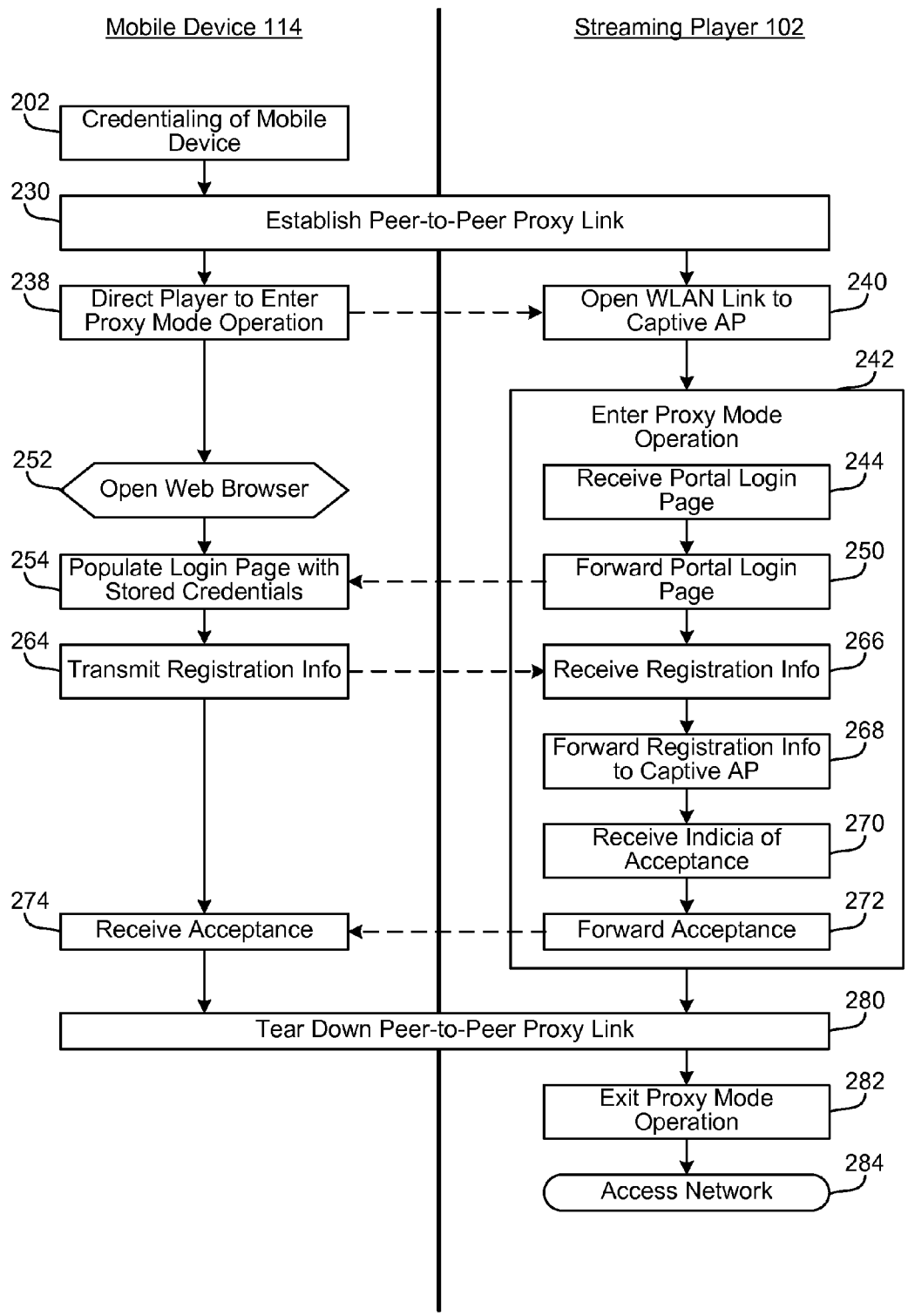
FIG. 2 illustrates an example of a process for sharing stored portal login credentials between the streaming media player and a mobile computing device.

FIG. 2 illustrates an example of a process of directed by the mobile device 114 for sharing credentials with the streaming device 102. The mobile device 114 registers (202) with the captive active point 110. Either the mobile device 114 or the streaming player 102 establishes (230) the peer-to-peer proxy link 116.

A variety of triggers may cause the proxy link 116 to be established. From the mobile device 114 side, an example of a trigger to establish the proxy link 116 is a user accessing a user interface on the mobile computing device 114 and instructing the device to connect to the streaming media player 102. Another trigger is the mobile computing device 114 detecting a radio beacon of the streaming media player 102 (e.g., Bluetooth, WiFi Direct) when the player 102 powers up, and establishing the link 116 based upon a configuration setting on the mobile computing device 114. As another trigger, the mobile device 114 may periodically broadcast a "are you there" message, establishing the proxy link 116 upon receiving a reply. Automatic action by the mobile computing device 114 to establish the proxy link 116 may be predicated on a determination by the mobile computing device 114 that the access point 110 is captive.

From the streaming media player 102 side, an example of a trigger to establish the proxy link 116 is searching for a radio beacon of the mobile computing device 114 upon power-up based on configuration setting on the streaming player 102. As another trigger, the media player 102 may periodically broadcast a "are you there" message, establishing the proxy link 116 upon receiving a reply. Automatic action by the streaming media player 102 to establish the proxy link 116 may be predicated on a determination by the streaming media player 102 that the access point 110 is captive.

After the peer-to-peer proxy link 116 is set up, the mobile computing device 114 directs (238) the streaming player 102 to enter into a captive portal proxy (CPP) mode of operation. The directive may also include information identifying the captive access point. In response, the streaming player 102 opens (240) a WLAN link 108 to the captive access point 110 and enters proxy mode operation (242). Operating as a proxy, the streaming player 102 forwards data packets from the access point 110 to the mobile computing device 114, and forwards packets from the mobile computing device 114 to the access point 110. As noted above, the media player 102 may replace packet headers from the mobile device 114 with its own to identify itself solely as the origin of the packets. As received at the captive access point 110 via the media player 102, packets from the mobile computing device 114 forwarded via the proxy link 116 appear to have originated with the media player 102 (e.g., MAC address, header information).

After the streaming media player 102 opens the WLAN link 108 to the captive access point 110, the media player 102 receives (244) data packets comprising the portal login page, which it forwards (250) to the mobile device 114 via the proxy link 116. As discussed above, the portal login page may be received in response to a URL request made by the media player 102, may be received in response to a URL request made by the mobile computing device 114 (via the proxy link 116), or may be pushed to the media player 102 by the captive portal system 190.

If not already open, the mobile device 114 opens 252 its web browser after opening the proxy link 116. After receiving the data packets comprising the portal login page from the streaming player 102 via the proxy link 116, the web page instantiated by the web browser and is populated (254) with credentials that were stored by the mobile device 114 when it registered with the captive portal system 190. As noted above, fields may be completed, button and/or check buttons may be set, etc. A user may also interact with the web page via a direct input user interface of the computing device 114 (e.g., touch screen, single-keystroke direct user entry keyboard, etc.), and cause the registration to be submitted upon completion (e.g., click or touch an "enter" button on the portal login page).

The completed registration is transmitted (264) to the streaming player 102 via the proxy link 116. The streaming player 102 receives (266) the registration information and forwards (268) the information over the WLAN link 108 to the captive access point 110. As noted above, the registration information appears to have originated from the media player 102, replacing headers (if any) on data packets received over the proxy link 116 with header information identifying the media player 102.

The streaming media player 102 receives (270) indicia that the registration information was accepted via the WLAN link 108, and may be forward (272) the indicia to the mobile device. An example of indicia of acceptance of the registration information is receiving the HTTP response status code and the message elicited from a remote server via the network 199 (e.g., due to a prior URL request from the streaming player 102 and/or the mobile device 114 to the remote server).

The URL request resulting in the indicia of registration may be one that was earlier used to determine that the portal is captive (e.g., after acceptance, the captive portal system 190 replies by putting through the originally requested URL response). The URL request may also be the result of the "captive" state machine on either the mobile device 114 (via the proxy link 116) or the streaming media player 102 periodically attempting to send the URL request to the remote server to elicit a reply that is indicative of network access. In particular, after the registration information is submitted (268), either the mobile device 114 or the streaming media player 102 may resend the URL request to determine if the state is still "captive." The state machine may stay in "captive" operation mode until the elicited HTTP status code and message is received from the remote server via the network 199.

Although less reliable as indicia of acceptance due to the inconsistent adoption of standards, some captive portal systems report to the client device whether the registration was accepted at a protocol level. Others respond to acceptance by connecting the media player 102 to a completely different web page (e.g., a hotel information web page, to be rendered by the web browser of the mobile computing device 114 after being received (274) via the proxy link 116).

After receiving (274) the indicia of acceptance at the mobile device 114, the proxy link 116 may be torn down (280) by the mobile device 114 and/or the streaming player 102. In networking parlance, "tearing down" a communication channel is the opposite of establishing, opening, and setting up a communication channel. If the acceptance message is only an acceptance web page, then closing the proxy link 116 may be a manual operation, with the user closing the link after reviewing the acceptance web page via the mobile computing device's web browser, and/or may occur the next time a "captive" state machine on the either mobile computing device 114 or the streaming media player 102 receives the elicited response from the previously requested URL (e.g., as a result of the state machine periodically resending).

After acceptance by the captive portal system 190, the streaming player 102 exits (282) Captive Portal Proxy operation and accesses (284) the network (e.g., the Internet 199) in a normal manner.

Figure 3:
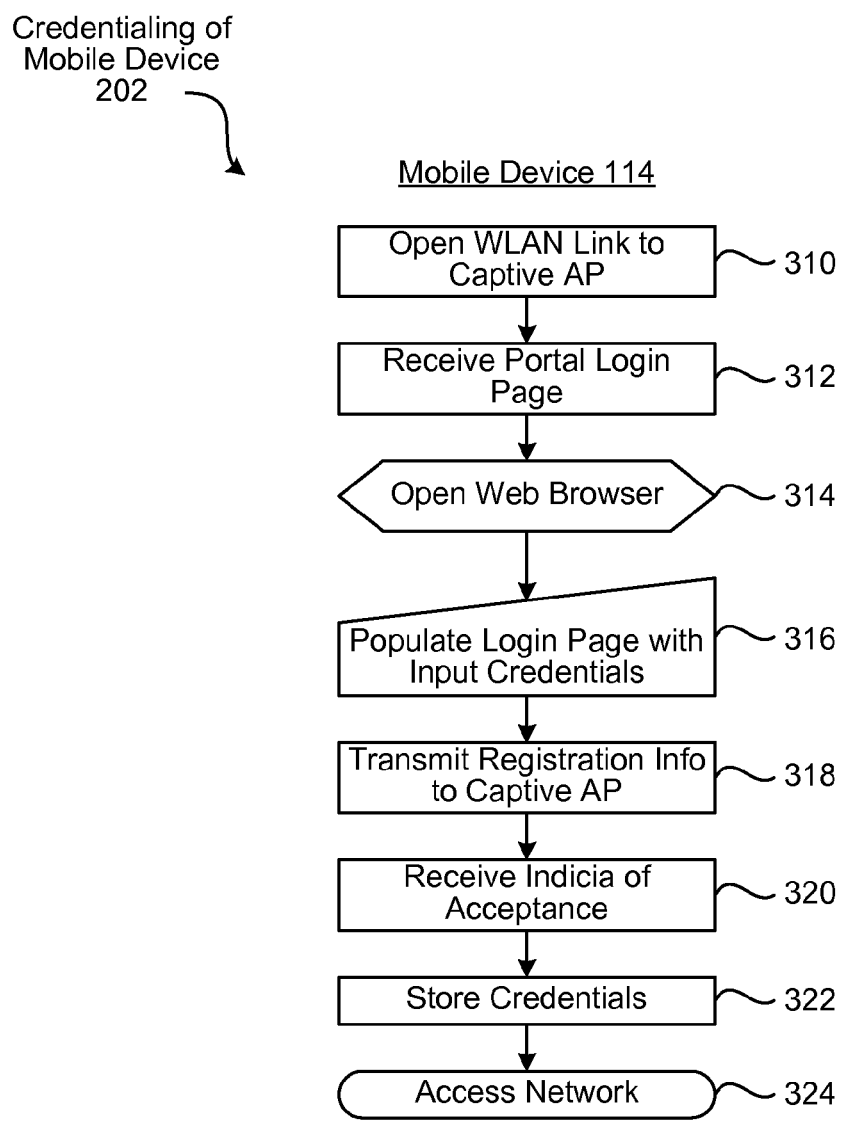
FIG. 3 illustrates an example of a process for the mobile computing device to connect to the captive access point and store the login credentials.

FIG. 3 illustrates the credentialing/registering (202) of the mobile device 114 with the captive portal system 190. The mobile computing device 114 opens (310) a WLAN link 112 with the captive access point 110. Upon opening the WLAN link 112, the mobile device 114 determines that the portal is captive (e.g., as a result of receiving an incorrect HTTP status code and/or message to a requested URL, as described above). The mobile device 114 thereafter receives (312) data packets comprising the portal login web page from the captive portal system 190 (e.g., in response to the requested URL that was redirected by the firewall 197 to the authentication server 198). If a web browser is not already open, the mobile device opens (314) a web browser and displays the received portal login web page.

After the mobile device 114 receives input data from a user interface to populate (316) the page, the registration information is transmitted (318) to the captive access point 110 via the WLAN link 112. The mobile device 114 may receive (320) indicia of registration acceptance via the WLAN link 112 (e.g., an elicited HTTP status code and message from the remote network-connected server, etc.), and stores (322) the credentials used to populate the web page. After acceptance, the mobile device 202 may access (324) the network 199 via the WLAN link 112.

Figure 4:
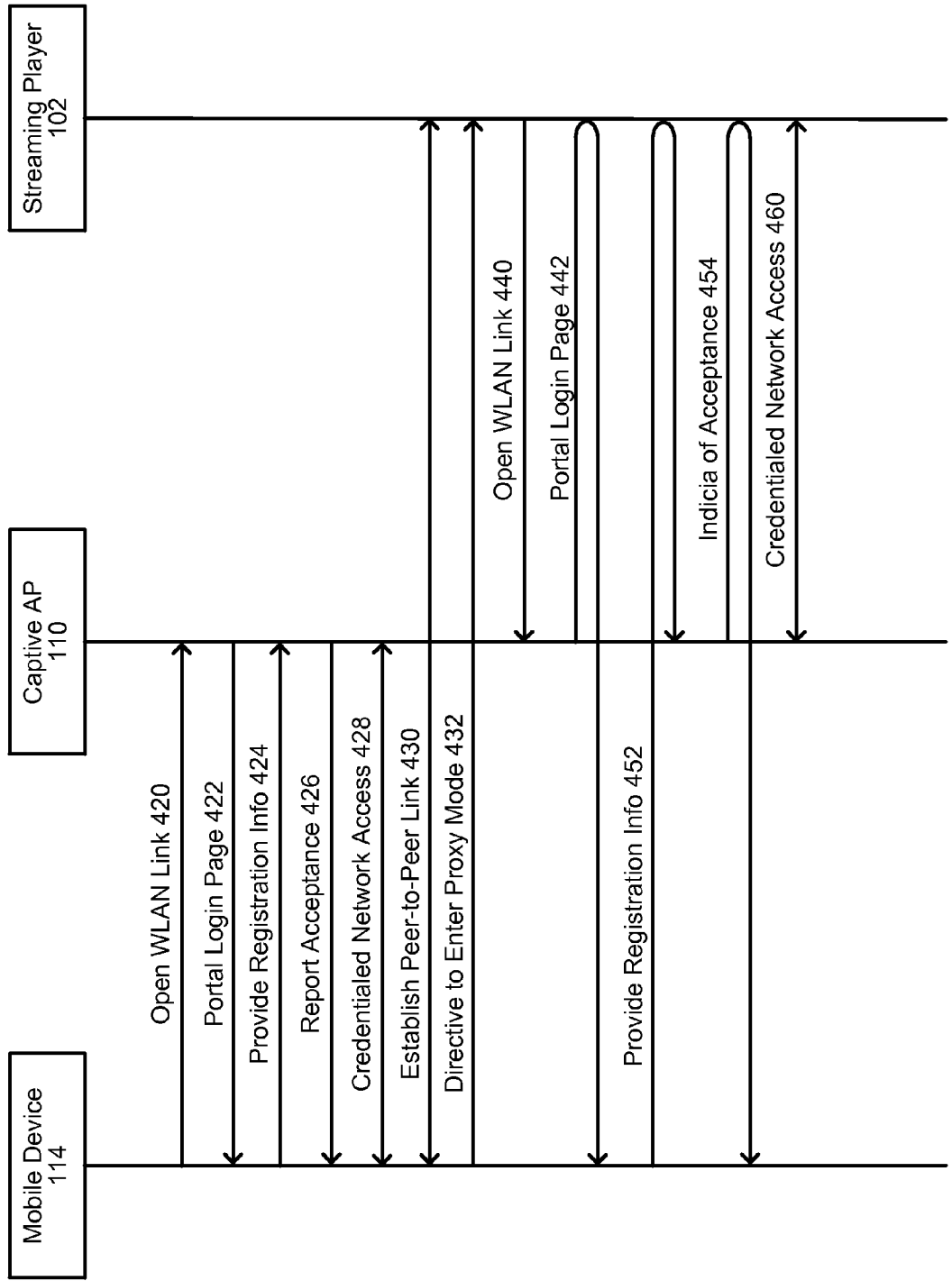
FIG. 4 is a signal flow diagram based on the processes in FIGS. 2 and 3.

FIG. 4 is a signal flow diagram based on the processes in FIGS. 2 and 3. Incidental signals such as acknowledgements and communication link set-up protocol messages are omitted for brevity.

The signal flow begins with the process from FIG. 3. The mobile device 114 opens (420) the WLAN link 112 with the captive access point 110. After the link 112 is established, the captive access point 110 transmits (422) data packets comprising the portal login page to the mobile device 114 (e.g., in response to opening the connection or in response to the mobile device attempting to access a URL across the network 199). The mobile device 114 provides (424) the registration information to the captive access point 110. The access point 110 reports (426) indicia of acceptance of the registration to the mobile device 114. After successful registration, the mobile device 114 is allowed access (428) to the network 199.

Referring to the signaling produced by the process from FIG. 2, either the mobile device 114 or the streaming player 102 requests (430) establishment of the peer-to-peer proxy link 116. After the link is established, the mobile device 114, having registered (202) with the portal, sends a directive (432) to the streaming player 102 to enter captive portal proxy (CPP) mode. The directive (432) to enter CPP mode may include the name of the captive access point 110, directing the streaming player to open the WLAN link 108 to the captive access point 110. If the captive access point 110 is secure rather than open, login credentials to open the WLAN link 108 may also be included with the directive. The instruction to open the WLAN link and the credentials to use if the link is secure may be based on existing inter-device credential sharing protocols.

The streaming player 102 then signals (440) the captive access point 110 to open the WLAN link 110. Thereafter, having entered CPP mode, when the captive access point 110 sends (442) the data packets comprising the portal login page, the streaming player 102 relays the page to the mobile device 114 through the proxy link 116. When the mobile device 114 transmits the registration information (452) to the streaming player 102 through the proxy link 116, the streaming player 102 forwards the registration information to the captive portal 110 over the WLAN link 108. When the registration information is forwarded by the streaming player 102 operating in CPP mode to the captive access point 110, any indicia as to the origin of the registration information is replaced/changed/added to indicate that the registration information originated with the streaming player 102, rather than the mobile computing device 114.

After receiving the registration information, the streaming player 102 receives indicia of acceptance via the WLAN link 108, and forwards the indicia of acceptance to the mobile device 114. After registration acceptance, the streaming player 102 has access (460) to the network 199. Additional signaling that may be shared after registration include a directive by the mobile device 114 to the streaming player 102 to exit CPP mode, and a message from either the mobile device 114 or the streaming player 102 relating to the tear-down of the proxy link 116.

Figure 5:
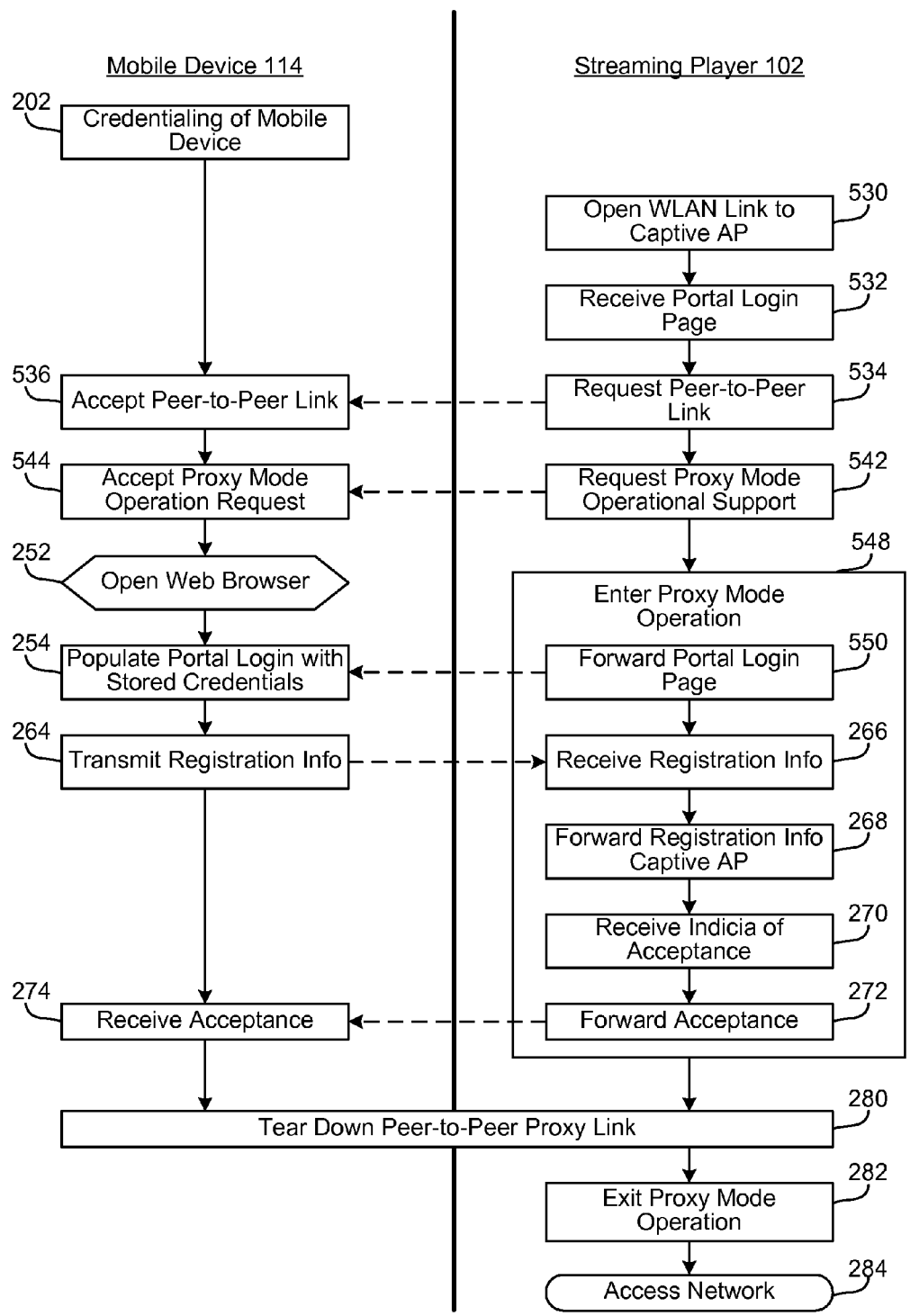
FIG. 5 illustrates another example of a process for sharing stored login credentials between the streaming media player and a mobile computing device.

FIG. 5 illustrates a process where the mobile device 114 does not instruct the streaming player 102 to enter CPP mode, but rather, the streaming player 102 asks the mobile device 114 to support CPP mode operation, and the mobile device 114 has already registered (202) with the captive portal system 190. The streaming player 102 opens (530) the WLAN link to the captive access point 110. For example, the streaming player 102 may output a selection of WLAN access points within range on television 104, with the user using the remote control 106 to select an access point.

The streaming media player 102 then determines that the access point 110 is captive (as discussed above). The streaming media player 102 may temporarily store received data packets (e.g., comprising a portal login page) for later forwarding to the mobile device 114.

Having determined that the access point 110 is captive, the streaming player 102 requests (534) the opening of the proxy link 116 with the mobile device 114. This request may be based, for example, on the streaming player 102 detecting the mobile device 114 within range, having been previously been "paired" with the device for the purposes of credential sharing (based on a stored list of paired devices). After the mobile device 114 accepts (536) the peer-to-peer proxy link 102, the streaming player 102 requests (542) that the mobile device 114 support CPP mode operation. After the mobile device 114 accepts (544) the CPP operation request, the streaming player 102 enters CPP mode (548), reconfiguring itself as a proxy between the mobile computing device 114 and the captive access point 110. If the web browser of the mobile device 114 is not already open, the mobile device 114 may open (252) its web browser in response to accepting CPP operation.

The media player 102 forwards (550) data packets comprising the portal login page to the mobile computing device 114. If the streaming media player 102 previously buffered the received data packets comprising the portal login page, the stored packets may be forwarded to the mobile device 114. The mobile device 114 may also refresh the connection through the proxy link to the captive access point 110, causing the media player 102 operating as a proxy to receive and forward additional data packets comprising the portal login page. Likewise, the mobile device 114 may cause the portal login page to be resent by trying to reach a network URL outside of the captive portal system 190. The portal login page is then populated (254) with credentials stored by the mobile device 114 when it registered (202) with the access point 110. The process of registering the streaming player 102 process continues (264 to 284) as discussed with FIG. 2.

Figure 6:
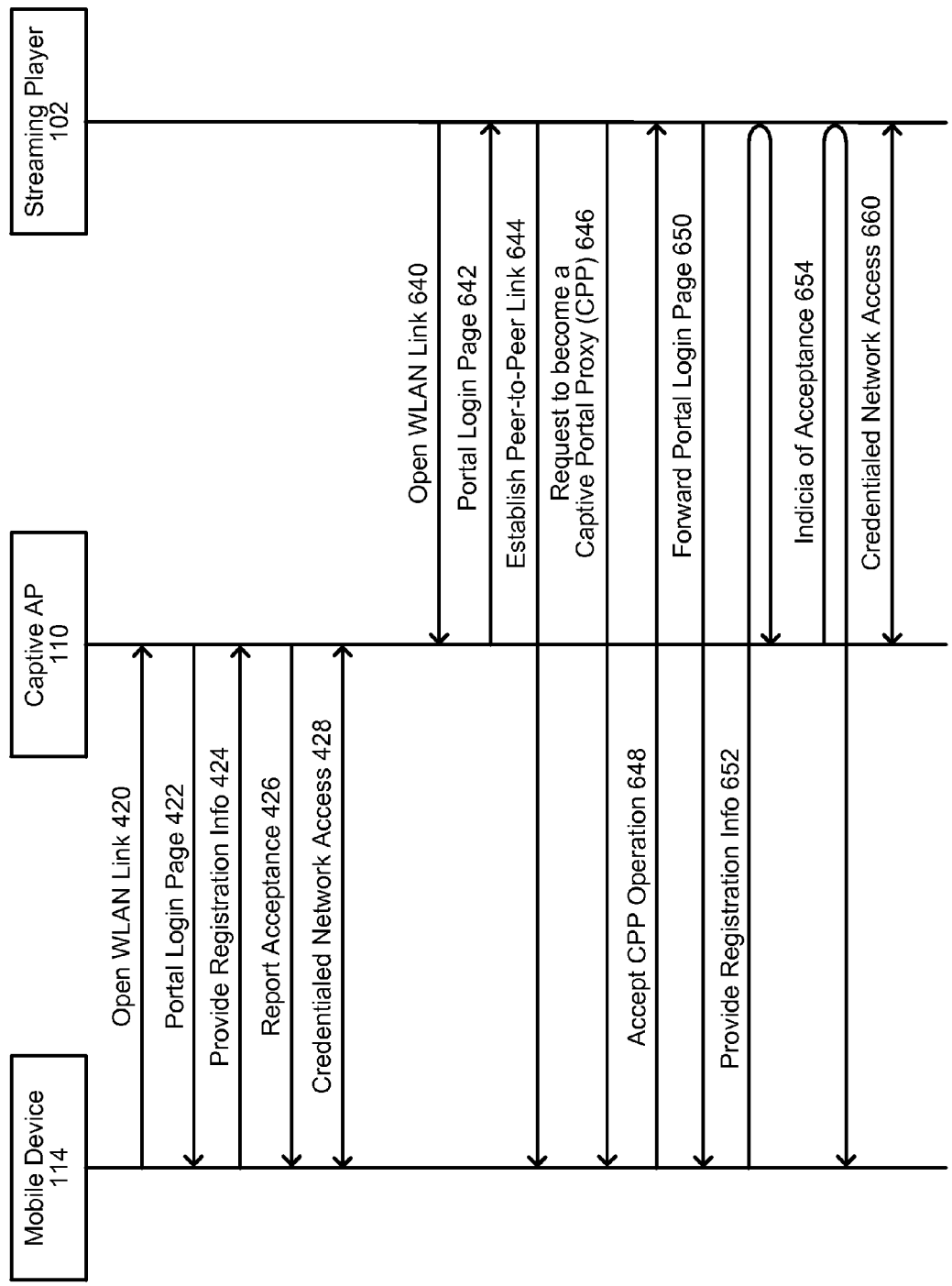
FIG. 6 is a signal flow diagram based on the processes in FIGS. 3 and 5.

FIG. 6 is a signal flow diagram based on the processes in FIGS. 3 and 4. Incidental signals such as acknowledgements and communication link set-up protocol messages are omitted for brevity.

The signal flow begins with signals driven by the process from FIG. 3, comprising a series of signal transactions (420 to 428). The discussion in connection with FIG. 4 of the signals relating to registering (202) the mobile device 114 with the captive portal system 190 are also applicable to FIG. 6.

The streaming player 102 opens (640) the WLAN link 108 to the captive access point 110. For example, a user may select the captive access point 110 from a list of access points within range, the list being displayed on the television 104 and the captive access point 110 being selected using the remote control 102.

After the WLAN link 108 is open, the streaming player 102 determines that the portal is captive and receives (642) data packets comprising the captive portal login page from the captive access point 110. The streaming player 102 may or may not recognize that the data packets comprise a portal login page. For example, the streaming player 102 may determine that the received data packets do not contain the HTTP status code and expected message contents elicited from a remote server over the network 199. The streaming player 102 may optionally store the data packets for later forwarding to the mobile device 114 after CPP mode is initiated.

Having determined that the access point 110 is captive, the streaming player 102 signals 644 the mobile device to establish the peer-to-peer proxy link 116. Via the proxy link 116, the streaming player 102 also requests (646) that the mobile device 114 support CPP mode operations. The mobile device 114 signals (648) that it will support CPP operations. The streaming player 102 forwards (650) data packets comprising the portal login page to the mobile device 114, which may be earlier-stored packets or packets resulting from subsequent action by either the mobile device 114 or the streaming player 102 (e.g., sending a refresh request, attempting to access a remote URL, etc.).

When the mobile device 114 transmits the registration information (652) to the streaming player 102 through the P2P proxy link 116, the streaming player 102 forwards the registration information to the captive portal 110 over the WLAN link 108. When the registration information is forwarded by the streaming player 102 operating in CPP mode to the captive access point 110, any indicia as to the origin of the registration information is replaced/changed/ added to indicate that the registration information originated with the streaming player 102, rather than the mobile computing device 114.

After receiving the registration information, streaming media player 102 receives indicia of acceptance, and forwards the indicia of acceptance to the mobile device 114. After registration acceptance, the streaming player 102 has access (660) to the network 199. Additional signaling that may be shared after registration include a directive from the mobile device 114 to the streaming player 102 to exit CPP mode, and a message from either the mobile device 114 or the streaming player 102 relating to the tear-down of the P2P proxy link 116.

Figure 7:
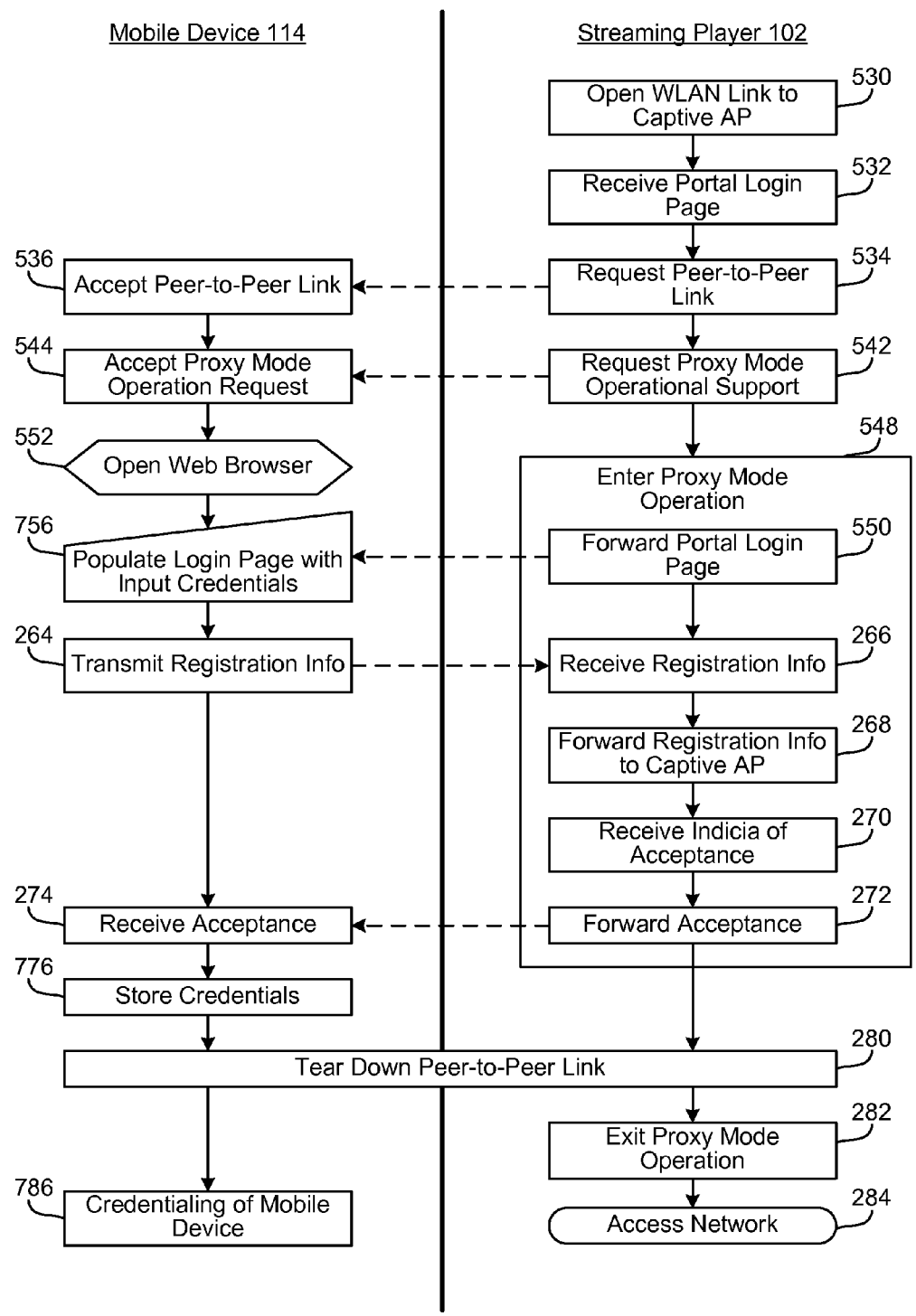
FIG. 7 illustrates an example of a process for the mobile device to register the streaming media player with the captive access point.

FIG. 7 illustrates a process similar to that in FIG. 5, but in which the mobile computing device 114 has not already registered with the captive portal system 190 via WLAN link 112. With the exception of the mobile device not having registered with the access point, the process is the same as describe in connection with FIG. 5 up through the streaming player 102 forwarding 550 the data packets including the portal login page (e.g., forwarding a stored page, forwarding a page delivered due to a refresh request, etc.).

After the mobile device 114 receives input data from a user interface to populate (756) the page, the registration information is transmitted (264) to streaming media player 102 via the peer-to-peer proxy link 116. The process of registering the streaming media player 102 and accessing the network 199 continues (steps 266 through 284) as discussed with FIGS. 2 and 5.

Figure 8:
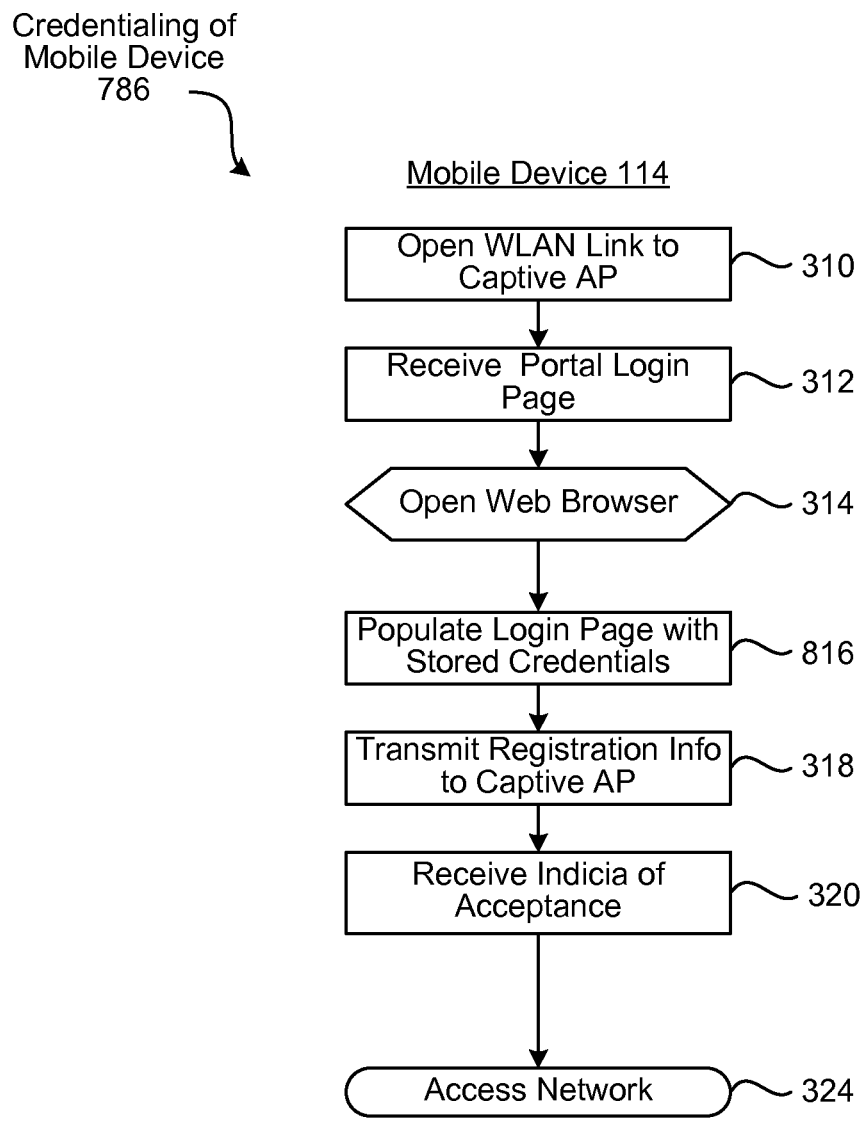
FIG. 8 illustrates an example of a process for the mobile computing device to connect to the captive access point using credentials stored when registering the streaming media player.

In FIGS. 7 and 8, the mobile device 114 performs additional steps so as to register 786 itself with the captive portal system 190 via the WLAN link 112, using credentials stored 776 during proxy operations with the streamlining media player 102.

This process of registering the mobile computing device 114 with the captive portal system 190, as illustrated in FIG. 8, is substantially the same as that discussed in connection with FIG. 3. The mobile computing device 114 opens (310) a link 112 with the captive access point 110. The mobile device 114 thereafter receives (312) the data packets including the portal login web page from the captive portal system 190. If a web browser is not already open, the mobile device opens (314) a web browser and displays the received portal login web page.

Different than the process in FIG. 3, the portal login page is populated (816) with credentials stored (776) by the mobile device 114 when the portal web page was populated (756) for the streaming player 102 operating in CPP mode (548). As noted above, fields may be completed, button and/or check buttons may be set, etc. A user may also interact with the web page via an input interface of the computing device 114 (e.g., touch screen, keyboard, etc.), and cause the registration to be submitted upon completion.

Operations then continue in a manner similar to that described in connection with FIG. 3. The portal registration information is transmitted (318) to the captive access point 110 via the WLAN link 112. The mobile device 114 may receive (320) indicia of registration acceptance via the WLAN communications link 112 to the access point 110. After acceptance, the mobile device 114 may access (324) the network 199 via the WLAN link 112.

Figure 9:
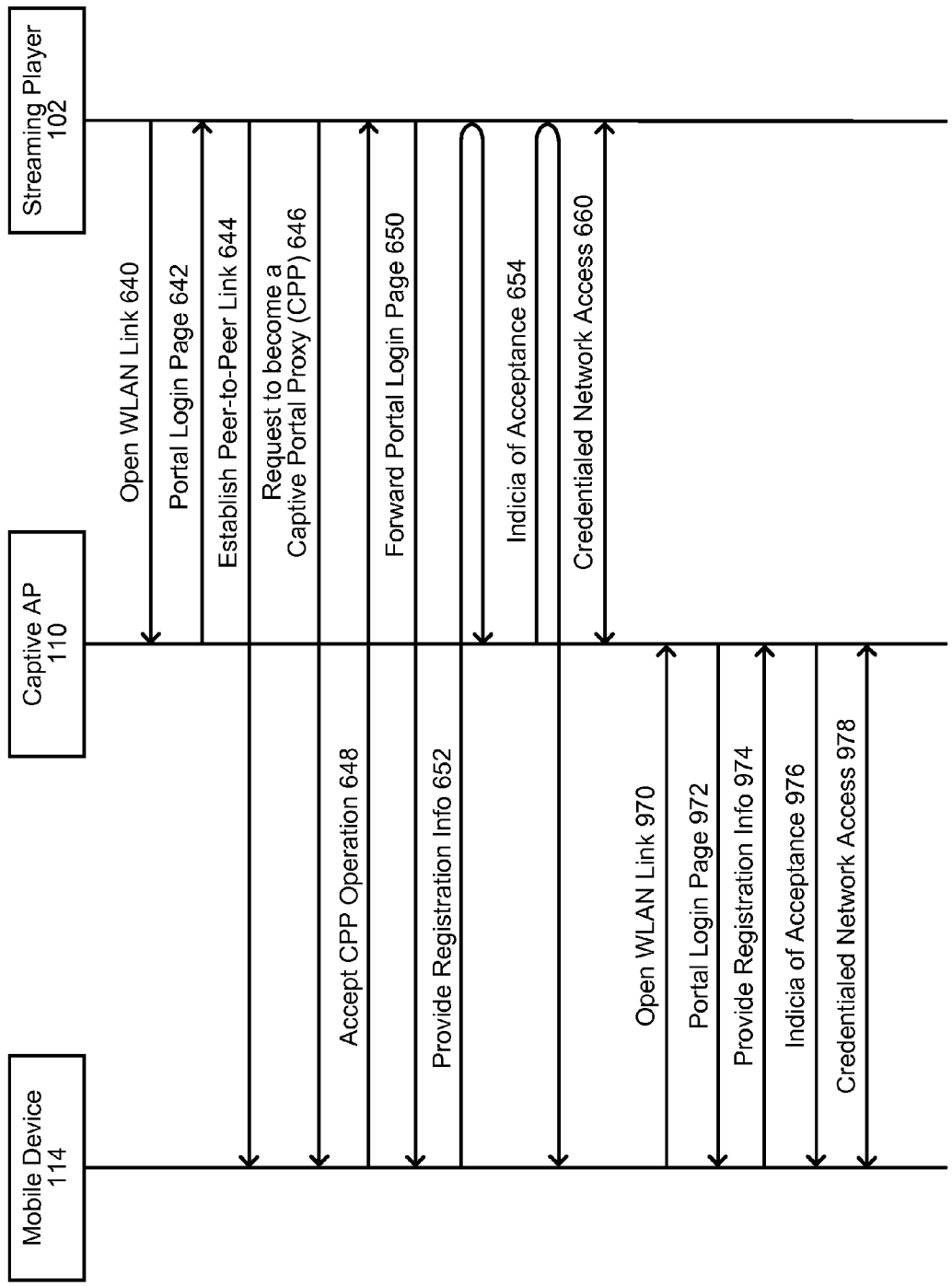
FIG. 9 is a signal flow diagram based on the processes in FIGS. 7 and 8.

FIG. 9 is a signal flow diagram based on the processes in FIGS. 7 and 8. Incidental signals such as acknowledgements and communication link set-up protocol messages are omitted for brevity.

The signal flow in FIG. 9 begins with signals driven by the process from FIG. 7, comprising a series of signal transactions (640 to 660). The discussion of these steps in connection with FIG. 6 of the signals relating to registering the streaming media player 102 operating in CPP mode are also applicable to FIG. 9.

The signal flow continues with the process from FIG. 8, with transactions 970 to 978 similar to those discussed in connection to FIGS. 4 (420 to 428) produced during registration of the mobile computing device 114 with the access point 110. The mobile device 114 opens (970) the WLAN link 112 with the captive access point 110. After the link 112 is established, the captive access point 110 transmits (972) the portal login page to the mobile device 114 (e.g., in response to opening the connection or in response to the mobile device attempting to access the network 199). The mobile device 114 provides (974) the previously stored registration information to the captive access point 110. The mobile device 114 receives (976) indicia of acceptance of the registration via the WLAN link 112. After successful registration, the mobile device 114 is allowed access (978) to the network 199.

Figure 10:
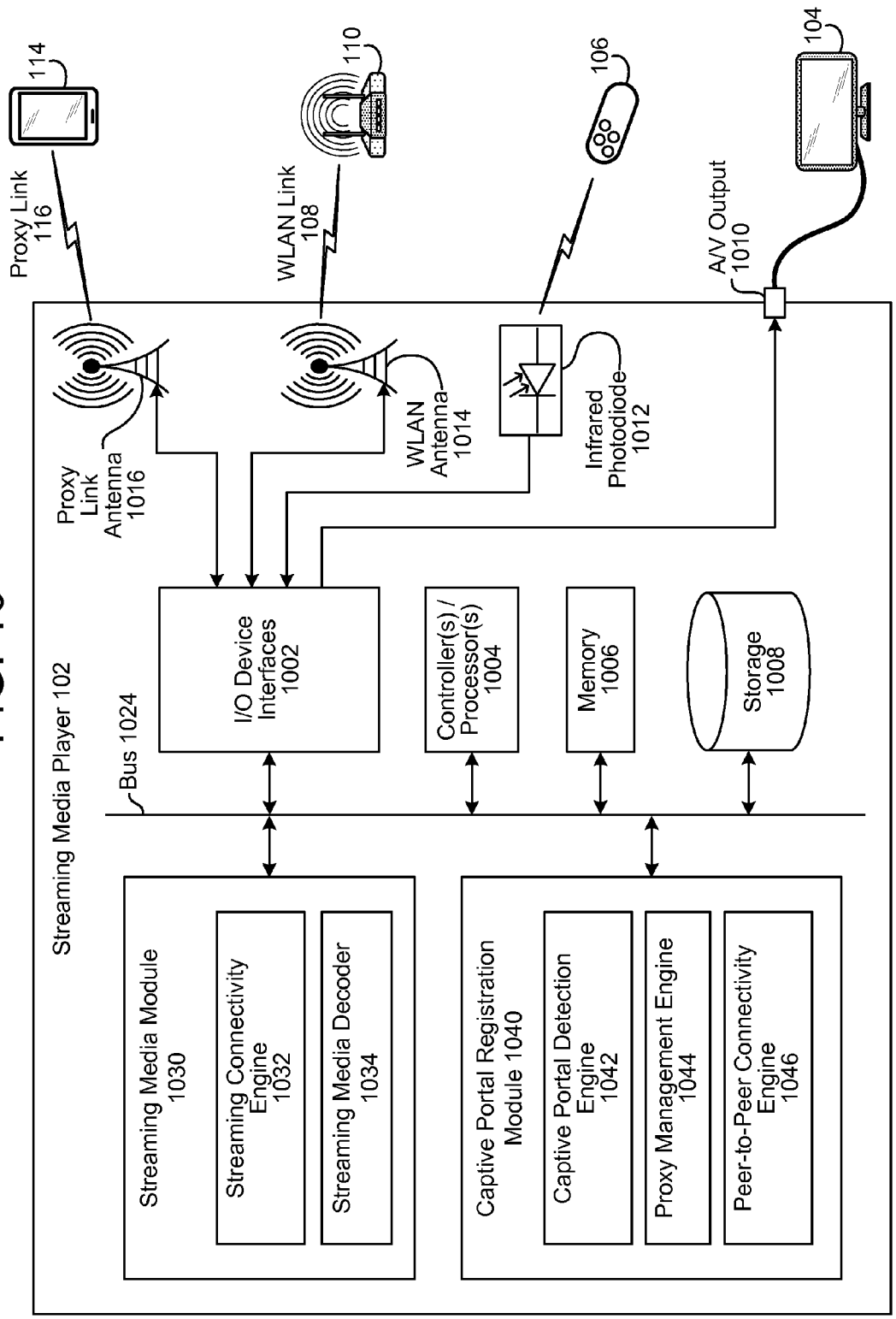
FIG. 10 is a block diagram conceptually illustrating example components of the streaming media player.

FIG. 10 is a block diagram conceptually illustrating example components of the streaming media player 102. As noted above, although the device 102 is illustrated and described as a streaming media player, device 102 may be any input-limited device which does not have rich user input capabilities. In operation, the streaming media player 102 may include computer-readable and computer-executable instructions that reside on the player 102, as will be discussed further below.

As illustrated in FIG. 10, the streaming media player 102 is an input-limited device, such as a device that can receive basic inputs (e.g., up-down-left-right-enter) from a remote control 106, but lacks more conventional rich user input capabilities, such as a keyboard and/or a touch screen able to accept direct single-keystroke entry of text.

The player 102 includes input/output (I/O) device interfaces 1002, which provide the player 102 with connectivity and protocol support. A variety of input and output connections may be made through the input/output device interfaces 1002. For example, an infrared photodiode 1012 may be used to receive control signals from remote control 106. A WLAN antenna 1014 may be use to provide connectivity to the portal access point 110. The same WLAN antenna 1014 or another antenna 1016 may be used for the proxy link 116 to the mobile computing device 114.

A variety of protocols may be supported by the I/O device interfaces 1002 for the proxy link 116. For example, the proxy link 116 may be Bluetooth, WiFi Direct, or Near Field Communication (NFC). In the alternative, instead of using a radio frequency (RF) interface for the peer-to-peer link, the link may be based on another technology, such as ultrasonic communication or infrared communication. Likewise, as an alternative to using infrared for the remote control 106, the I/O device interfaces 1002 may support receiving RF or an ultrasonic from the remote control 106. Also, either in addition to or as an alternative to the WLAN antenna 1014 servicing the WLAN link 108 to the access point 110, the I/O device interfaces 1002 may support a wired connection such as Ethernet by which to connect to the captive portal system 190 and the network 199.

The input/output device interfaces 1002 may support an audio/video (A/V) output 1010 used to convey user interfaces and media to a connected television 104 or monitor. The A/V output may be a wired connection (as illustrated) or wireless connection (i.e., RF). An example of a wired protocol that may be supported by the I/O device interfaces 1002 for A/V output 1010 includes High-Definition Multimedia Interface (HDMI). Examples of wireless A/V output 1010 connections that may be supported by the I/O device interfaces 1002 include Wireless Home Digital Interface (WHDI) and Miracast.

The input/output device interfaces 1002 may also support other types of connections and communications protocols. For example, the player 102 may also include an interface for an external peripheral device connection such as universal serial bus (USB), FireWire, Thunderbolt or other wired connection protocol.

The I/O device interfaces 1002 may also support other wireless connection protocols in addition to WLAN (e.g., WiFi), Bluetooth, WiFi Direct and/or NFC. For example, either of the peer-to-peer proxy link 116 and the remote control 106 may communicate with the player 102 using IrDA, wireless USB (universal serial bus), Z-Wave (a home automation radio technology), and/or ZigBee (i.e., the IEEE 802.15.4 standards). Instead of or in addition to WLAN and/or Ethernet, either the peer-to-peer proxy link 116 or the WLAN link 108 may be replaced with some other type of network communication support, such as cellular data communications related to a Long Term Evolution (LTE) network, WiMAX network, CDMA network, GSM network, etc. For example, the captive portal system 190 may support LTE connectivity, where a client device (e.g., 102, 114) associated with an unregistered subscriber identification module (SIM) is provided the opportunity to register via a portal web page transmitted to the client device after it opens the communication link or attempts to access the network.

The player 102 may include an address/data bus 1024 for conveying data among components of the player 102. Each component within the player 102 may also be directly connected to other components in addition to (or instead of) being connected to other components across the bus 1024.

The player 102 may include one or more controllers/processors 1004, that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The player 102 may also include a data storage component 1008, for storing data and controller/processor-executable instructions (e.g., instructions to perform the processes performed by the streaming player 102 in FIGS. 1, 2, 3, 5, 7, and 8). The data storage component 1008 may include one or more non-volatile storage types such as magnetic storage, optical storage, solid-state storage, etc. The player 102 may also be connected to removable or external non-volatile memory and/or storage (such as a removable memory card, memory key drive, etc.) through the input/output device interfaces 1002.

Computer instructions for operating the player 102 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The player 102 further includes a streaming media module 1030. The streaming media module 1030 includes a streaming module connectivity engine 1032 and a streaming media decoder 1034. The streaming media module 1030 operates in a conventional fashion, with the exception that the streaming connectivity engine 1032 may share connectivity transaction data (e.g., receipt of portal data pushed to the player 102 from the access point 110, inability to connect to a streaming service after establishing WLAN link 108, etc.) with a captive portal registration module 1040.

The captive portal registration module 1040 includes a captive portal detection engine 1042 that determines that the access point 110 is captive. For example, the captive portal detection engine 1042 may, after the streaming connectivity engine 1032 attempt to transmit a request to a specific URL over the network 199, determine that the HTTP response code and/or message received in response is not the response elicited by the URL. A proxy management engine 1044 of the captive portal registration module 1040 performs processes connected with captive portal proxy (CPP) mode operations. A peer-to-peer connectivity engine 1046 of the captive portal registration module 1040 perform processes to establish the peer-to-peer proxy link 116. The proxy management engine 1044 determines that proxy operations are warranted based on either a determination by the captive portal detection engine 1042 that the access point 110 is captive or based on a directive (e.g., 238, 432) from the mobile device 114 to initiate CPP mode operations. The proxy management engine 1044 is responsible for CPP mode establishment and operations, in coordination with the peer-to-peer connectivity engine 1046, which manages the peer-to-peer proxy link 116 (e.g., establishment and teardown).

The peer-to-peer connectivity engine 1046 may determine to open the peer-to-peer proxy link 116 either automatically or at the direction of the proxy management engine 1044 based on a list of "paired" devices with rich interfaces stored in storage 1008. If a peer-to-peer proxy link 116 is to be initiated, the peer-to-peer connectivity engine 1046 accesses the stored list, and compares listed devices to devices determined to be within range (e.g., proximate RF, infrared, ultrasonic). The peer-to-peer connectivity engine 1046 is also used to create new pairings, adding new devices to the stored list.

FIG. 11 is a block diagram conceptually illustrating example components of the mobile computing device 114. As noted above, the mobile computing device 114 is a device with a full-featured user interface that supports a web browser, such as a notebook computer, a tablet computer, or a smart phone. In operation, the mobile computing device 114 may include computer-readable and computer-executable instructions that reside on the mobile computing device 114, as will be discussed further below.

As illustrated in FIG. 11, the mobile computing device 114 is a full-featured user interface device that provides at least one user interface for direct single-keystroke entry of alphanumeric text, such as a device that includes a display 1110 with a touch interface 1112 for display of the portal web page and a virtual alphanumeric keyboard, or a device with the display 1110 with a physical alphanumeric keyboard (not illustrated).

The mobile computing device 114 includes input/output (I/O) device interfaces 1102, which provide the mobile computing device 114 with connectivity and protocol support. A variety of input and output connections may be made through the input/output device interfaces 1102. For example, a WLAN antenna 1114 may be use to provide connectivity to the portal access point 110. The same WLAN antenna 1114 or another antenna 1116 may be used for the proxy link 116 to the streaming media player 102.

As described in connection to the streaming media player 102, a variety of protocols may be supported by the I/O device interfaces 1102 for the proxy link 116. For example, the proxy link 116 may be Bluetooth, WiFi Direct, or NFC. In the alternative, instead of using a radio frequency (RF) interface for the peer-to-peer link, the link may be based on another technology, such as ultrasonic communication or infrared communication. Also, either in addition to or as an alternative to the WLAN antenna 1114 servicing the WLAN link 112 to the access point 110, the I/O device interfaces 1102 may support a wired connection such as Ethernet by which to connect to the captive portal system 190 and the network 199.

The input/output device interfaces 1102 may also support other types of connections and communications protocols. For example, the mobile computing device 114 may also include an interface for an external peripheral device connection such as universal serial bus (USB), FireWire, Thunderbolt or other wired connection protocol.

The I/O device interfaces 1102 may also support other wireless connection protocols in addition to WLAN (e.g., WiFi), Bluetooth, WiFi Direct, and/or NFC. For example, the peer-to-peer proxy link 116 may communicate with the streaming media player 102 using IrDA, wireless USB (universal serial bus), Z-Wave (a home automation radio technology), and/or ZigBee (i.e., the IEEE 802.15.4 standards). Instead of or in addition to WLAN and/or Ethernet, either the peer-to-peer proxy link 116 or the WLAN link 112 may be replaced with some other type of network communication support, such as cellular data communications related to a Long Term Evolution (LTE) network, WiMAX network, CDMA network, GSM network, etc. For example, the captive portal system 190 may support LTE connectivity, where a client device (e.g., 102, 114) associated with an unregistered subscriber identification module (SIM) is provided the opportunity to register via a portal web page transmitted to the client device after it opens the communication link or attempts to access the network.

The mobile computing device 114 may include an address/data bus 1124 for conveying data among components of the mobile computing device 114. Each component within the mobile computing device 114 may also be directly connected to other components in addition to (or instead of) being connected to other components across the bus 1124.

The mobile computing device 114 may include one or more controllers/processors 1104, that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The mobile computing device 114 may also include a data storage component 1108, for storing data and controller/processor-executable instructions (e.g., instructions to perform the processes performed by the mobile computing device 114 in FIGS. 2, 3, 5, 7, and 8). The data storage component 1108 may include one or more non-volatile storage types such as magnetic storage, optical storage, solid-state storage, etc. The mobile computing device 114 may also be connected to removable or external non-volatile memory and/or storage (such as a removable memory card, memory key drive, etc.) through the input/output device interfaces 1102.

Computer instructions for operating the mobile computing device 114 and its various components may be executed by the controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The mobile computing device 114 further includes a captive portal registration module 1140. A captive portal detection engine 1142 of the captive portal registration module 1140 may determine that the access point 110 is captive. For example, the captive portal detection engine 1142 may, after the operating system or an application executed by controller(s)/processor(s) 1104 attempts to transmit a request to a specific URL over the network 199, determine that the HTTP response code and/or message received in response is not the response elicited by the URL.

A credentials management engine 1144 of the captive portal registration module 1140 performs processes connected with captive portal proxy (CPP) mode operations. A peer-to-peer connectivity engine 1146 of the captive portal registration module 1140 performs processes to establish the peer-to-peer proxy link 116. The credentials management engine 1144 accepts proxy operation requests from the streaming media player 102, directs the streaming media player 102 to initiate CPP operations, stores credentials and user selections when populating/completing a portal web page, and populates portal web pages using stored credentials and user selections. The credentials management engine 1144 may direct the streaming media player 102 to initiate CPP mode after the captive portal detection engine 1142 determines the access point 110 is captive and the peer-to-peer connectivity engine 1146 detects the streaming media player 102.

The peer-to-peer connectivity engine 1146 may determine to open the peer-to-peer proxy link 116 either automatically or at the direction of the credentials management engine 1144 based on a list of "paired" devices with input-limited interfaces stored in storage 1108. If a peer-to-peer proxy link 116 is to be initiated, the peer-to-peer connectivity engine 1146 accesses the stored list, and compares listed devices to devices determined to be within range (e.g., proximate RF, infrared, ultrasonic). The peer-to-peer connectivity engine 1146 is also used to create new pairings, adding new devices to the stored list.

Credentials storage 1148 stores login credentials and user choices when the portal web page is completed, so that the stored information may be used later to either register a client proxy device (e.g., the streaming media player 102), or to register the mobile computing device 114 itself (if the client proxy device is registered first as discussed in connection with FIGS. 7 and 8). The credentials storage 1148 may be part of memory 1106, storage 1108, or a separate storage element.

The concepts disclosed herein may be applied within a number of different devices and computer systems, including for example, input-limited computer systems such as HDMI streaming media dongles, multimedia set-top boxes, DVD and Blu-ray players, wearable computing devices (watches, glasses, etc.), etc., and full-featured computing devices, including for example, laptop computers, cellular "smart" telephones, personal digital assistants (PDAs), and tablet computers, wearable computing devices (e.g., watches, glasses), etc.

The disclosed examples were chosen to explain the principles and application of the disclosure and are not intended to be exhaustive or to limit the disclosure. Many modifications and variations of the disclosed aspects may be apparent to those of skill in the art. Persons having ordinary skill in the field of device credentials sharing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The processes and device operations related to credentials sharing and CPP-mode operations may be performed as operating system level operations and/or by software applications executed by the streaming media player 102 and the mobile computing device 114. As such, aspects of the disclosed system 100 may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the streaming media module 1030, the captive portal registration module 1040, and the captive portal registration module may be implemented as firmware or as a state machine in hardware. For example, at least the streaming media decoder 1034 of the streaming media module 1030 may be implemented as an application specific integrated circuit (ASIC), a digital signal processor (DSP), or some combination thereof. As another example, the proxy management engine 1044 and/or the credentials management engine 1144 may be implemented as a state machine using a field programmable gate array (FPGA).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    establishing a first communication connection between a first computing device and a captive access point via a first communication channel;
    establishing a second communication connection between the first computing device and a second computing device via a second communication channel that is separate from the first communication channel and independent of the captive access point, the second communication channel connecting the first computing device directly to the second computing device;
    configuring the first computing device to serve as a proxy between the captive access point and the second computing device;
    receiving data packets including web browser readable code for a portal login web page from the captive access point via the first communication connection;
    forwarding the data packets to the second computing device via the second communication connection, the portal login web page requesting user login and password information in order to gain access to a network through the captive access point;
    receiving registration information comprising the user login and password information responsive to the portal login web page from the second computing device via the second communication connection,
    forwarding the registration information to the captive access point via the first communication connection;
    removing, from the registration information, any indicia identifying an origin of the registration information as being the second computing device;
    receiving an indication that the registration information was accepted via the first communication connection;
    forwarding the indication that the registration information was accepted to the second computing device via the second communication connection; and
    accessing the network over the first communication connection through the captive access point.

2. The computer-implemented method of claim 1, further comprising:
    receiving an instruction via the second communication connection from the second computing device causing the first computing device to establish the first communication connection with the captive access point and to configure itself to serve as the proxy, the instruction identifying the captive access point.

3. A first computing device comprising:
    a processor;
    memory including instructions operable to be executed by the processor to perform a set of actions to configure the processor to:
        receive a data packet including portal login web page information from a captive access point via a first communication connection;
        forward the data packets to a second computing device via a second communication connection;
        receive registration information responsive to the portal login web page from the second computing device via the second communication connection;
        remove, from the registration information, any indicia identifying an origin of the registration information as being the second computing device; and
        forward the registration information without the indicia to the captive access point via the first communication connection.

4. The first computing device according to claim 3, the instructions further configuring the processor to:
    receive a directive from the second computing device instructing the first computing device to establish the first communication connection, the directive including information identifying the captive access point.

5. The first computing device according to claim 3, the instructions further configuring the processor to:
    receive indicia of acceptance of the registration information from the captive access point via the first communication connection.

6. The first computing device according to claim 5, the instructions further configuring the processor to:
    close the second communication connection after detecting the indicia of acceptance.

7. The first computing device according to claim 5, wherein the indicia of acceptance comprises a Hypertext Transfer Protocol (HTTP) response status code and a message.

8. The first computing device according to claim 7, the instructions further configuring the processor to determine that the captive access point is captive after establishing the first communication connection by:
    transmitting a request via the captive access point to elicit the HTTP response status code and the message from a third computing device over the network;
    receiving a response to the request; and
    determining that the response does not include the HTTP response status code or the first message.

9. The first computing device according to claim 8, wherein the instructions further configure the processor to:
    establish the second communication connection in response to determining the captive access point is captive.

10. The first computing device according to claim 9, wherein the instructions configuring the processor to establish the second communication connection further configure the processor to:
    identify the second computing device based on a record stored in the memory indicating that the first computing device and the second computing device were previously paired via the second communication channel; and
    determine that the second computing device is in proximity of the first computing device via the second communication interface.

11. The first computing device according to claim 3, wherein the second communication channel is a peer-to-peer communication channel selected from WiFi Direct, Bluetooth, Near Field Communication, IrDA, wireless Universal Serial Bus, Z-Wave, or ZigBee.

12. A non-transitory computer-readable storage medium storing processor-executable instructions for controlling a first computing device, the instructions to configure the first computing device to:
receive a data packet including portal login web page information from a captive access point via a first communication connection;
forward the data packet, to a second computing device via a second communication connection;
receive registration information responsive to the portal login web page from the second computing device via the second communication connection;
remove, from the registration information, any indicia identifying an origin of the registration information as being the second computing device; and
forward the registration information without the indicia to the captive access point via the first communication connection.

13. The non-transitory computer-readable storage medium of claim 12, wherein the instructions are to further configure the first computing device to:
receive a directive from the second computing device instructing the first computing device to establish the first communication connection, the directive including information identifying the captive access point.

14. The non-transitory computer-readable storage medium of claim 12, wherein the instructions are to further configure the first computing device to:
receive indicia of acceptance of the registration information from the captive access point via the first communication connection.

15. The non-transitory computer-readable storage medium of claim 14, wherein the instructions are to further configure the first computing device to:
close the second communication connection after detecting the indicia of acceptance.

16. The non-transitory computer-readable storage medium of claim 14, wherein the indicia of acceptance comprises a Hypertext Transfer Protocol (HTTP) response status code and a message.

17. The non-transitory computer-readable storage medium of claim 16, wherein the instructions are to further configure the first computing device to determine that the captive access point is captive after establishing the first communication connection by:
transmitting a request via the captive access point to elicit the HTTP response status code and the message from a third computing device over the network;
receiving a response to the request; and
determining that the response does not include the HTTP response status code or the first message.

18. The non-transitory computer-readable storage medium of claim 17, wherein the instructions further configure the first computing device to:
establish the second communication connection in response to determining the captive access point is captive.

19. The non-transitory computer-readable storage medium of claim 18, wherein the instructions configuring the first computing device to establish the second communication connection further configure the first computing device to:
identify the second computing device based on a record stored in the memory indicating that the first computing device and the second computing device were previously paired via the second communication channel; and
determine that the second computing device is in proximity of the first computing device via a second communication interface of the first computing device configured to support the second communication channel.

20. The non-transitory computer-readable storage medium of claim 12, wherein the second communication channel is a peer-to-peer communication channel selected from WiFi Direct, Bluetooth, Near Field Communication, IrDA, wireless Universal Serial Bus, Z-Wave, or ZigBee.

* * * * *